United States Patent

Copple

[11] Patent Number: 5,929,614
[45] Date of Patent: *Jul. 27, 1999

[54] HIGH EFFICIENCY DC STEP-UP VOLTAGE CONVERTER

[75] Inventor: Earl James Copple, Arlington Heights, Ill.

[73] Assignee: Northrop Grumman Corporation, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/874,852

[22] Filed: Jun. 13, 1997

[51] Int. Cl.$^6$ ............................. G05F 1/10; G05F 1/40; G05B 24/02
[52] U.S. Cl. ........................ 323/222; 323/282; 323/351
[58] Field of Search ................................ 323/282, 222, 323/351

[56] References Cited

U.S. PATENT DOCUMENTS

| | | | |
|---|---|---|---|
| 4,316,136 | 2/1982 | Saxarra et al. | 323/282 |
| 4,577,268 | 3/1986 | Easter et al. | 363/21 |
| 4,626,976 | 12/1986 | Abe et al. | 363/19 |
| 4,816,739 | 3/1989 | Sakurai et al. | 323/272 |
| 4,970,451 | 11/1990 | Suomalainen | 323/222 |
| 4,975,819 | 12/1990 | Lannuzel | 363/16 |
| 5,119,013 | 6/1992 | Sabroff | 323/267 |
| 5,122,728 | 6/1992 | Ashley | 323/282 |
| 5,179,508 | 1/1993 | Lange et al. | 323/222 |
| 5,247,239 | 9/1993 | Yamamura et al. | 323/222 |
| 5,287,261 | 2/1994 | Ehsani | 363/124 |
| 5,321,348 | 6/1994 | Vinciarelli et al. | 323/222 |
| 5,367,247 | 11/1994 | Blocher et al. | 323/222 |
| 5,390,099 | 2/1995 | Rilly et al. | 363/16 |
| 5,406,192 | 4/1995 | Vinciarelli | 323/222 |
| 5,432,431 | 7/1995 | Vinciarelli et al. | 323/222 |
| 5,434,767 | 7/1995 | Batarseh et al. | 363/16 |
| 5,446,366 | 8/1995 | Bassett et al. | 323/222 |
| 5,457,379 | 10/1995 | Jacobs et al. | 323/222 |
| 5,508,602 | 4/1996 | Borgato et al. | 323/222 |
| 5,550,458 | 8/1996 | Farrington et al. | 323/282 |

*Primary Examiner*—Peter S. Wong
*Assistant Examiner*—Bao Q. Vu
*Attorney, Agent, or Firm*—Terry J. Anderson; Karl J. Hoch, Jr.

[57] ABSTRACT

A DC power converter is disclosed for converting an input voltage to a final output voltage that is higher than the input voltage. The power converter includes an input terminal for receiving the input voltage and a final output terminal. A boost converter generates an intermediate voltage that is higher than the input voltage and lower than the final output voltage. The boost converter includes an inductor having a primary winding that has a first end connected to the input terminal, a switch for selectively connecting the second end of the first winding to ground, a first diode connected between the second end of the first winding and an intermediate node, and a first output capacitor connected between the intermediate node and ground. The boost converter produces at the first output capacitor an intermediate voltage higher than the input voltage. The step up converter described further includes a second winding on the inductor, a first end of which is connected to receive the intermediate voltage. A diode is connected between the second end of the second winding and the converter output terminal. A second output capacitor is connected between the converter output terminal and ground.

10 Claims, 1 Drawing Sheet

HIGH EFFICIENCY DC STEP-UP VOLTAGE CONVERTER

BACKGROUND OF THE INVENTION

The present invention is a boost switching power converter. More specifically, the present invention is a converter for producing a DC voltage higher than that of the primary voltage source.

A common primary electrical power found in aircraft is either +28 volt DC (VDC) or three phase 115 volt AC (VAC), which is rectified and filtered to approximately 270 VDC. Many types of equipment have been designed to operate from either of these power sources.

Relatively small high power converters for changing the 115 VAC into +28 VDC have been known for some time. However, there has been a lack of small, efficient converters for changing +28 VDC into +270 VDC.

Boost converters have been used for some time to convert a low DC voltage into a higher DC voltage. A common boost converter includes an inductor, a diode, an output capacitor, and a power switching device. These converters for producing a voltage higher than the voltage of the primary source are sometimes referred to as "step-up" converters.

A common, known boost converter, or step up voltage converter, is shown in FIG. 1. Operation of the illustrated boost converter is well understood in the art. An input terminal 11 receives the input DC voltage ($V_{in}$). An input capacitor 13 is connected between the input terminal 11 and ground. An inductor 21 having inductance L1 is connected to the input terminal 11. A switch, such as a Field Effect Transistor (FET) 41, is connected between the "output" side of the inductor 21 and a second terminal, such as ground. The switching element 41 is controlled by a regulator control 31. The regulator control 31 governs the time the switch is on (conductive) or off (nonconductive). A rectifying diode 61 couples the output side of the inductor 21 to the converter output terminal 81. The converter output voltage $V_{out}$ is produced on the converter output terminal 81. An output filter capacitor 91 is connected between the output terminal and ground.

When the FET 41 is conductive, energy from the input terminal 11 charges the inductor 21. When the FET 41 is not conductive, that energy is discharged through the diode 61 to charge the output capacitor 91. The regulator control 31 governs the ratio of the time the FET is conductive (on) and nonconductive (off) so that the output voltage $V_{out}$ on the converter output terminal 81 remains constant. The regulator control adjusts the on/off cycle of the switch 41 by monitoring the voltage on the converter output terminal 81 through a feedback line 35.

The voltage rating of the switching transistor 41 is determined by the peak voltage that will appear across the transistor when the regulator control 31 turns the transistor off, as the inductor 21 flies up to the output voltage, plus whatever overshoot may be present due to unwanted parasitic elements. With allowance for some derating for safe applications, a boost converter with an output voltage $V_{out}$ of 270 VDC requires a switching FET capable of carrying a voltage of at least 400 volts across its drain and source (a $V_{DS}$ rating of at least 400 volts).

SUMMARY OF THE INVENTION

The present invention is a DC power converter for converting an input voltage to a final output voltage that is higher than the input voltage. The power converter includes an input terminal for receiving the input voltage and a final output terminal. A boost converter generates an intermediate voltage that is higher than the input voltage and lower than the final output voltage, wherein the boost converter includes an inductor having a primary winding. The power converter additionally includes a secondary winding on the inductor for increasing the intermediate voltage to the voltage higher than the intermediate voltage.

More specifically, the invention is a step-up DC to DC converter that includes an input terminal for receiving an input DC voltage and a converter output terminal. The step up converter of the invention further includes a boost converter comprising an inductor having a first winding having a first end connected to the input terminal, a switch for selectively connecting the second end of the first winding to ground, a first diode connected between the second end of the first winding and an intermediate node, and a first output capacitor connected between the intermediate node and ground. The boost converter produces at the first output capacitor an intermediate voltage higher than the input voltage. The step up converter of the invention further includes a second winding on the inductor, a first end of which is connected to receive the intermediate voltage. A diode is connected between the second end of the second winding and the converter output terminal. A second output capacitor is connected between the converter output terminal and ground.

An object of the invention is to provide an electrical converter for producing a voltage several times higher than the input voltage.

It is another object of the invention to provide an electrical converter that uses relatively small inexpensive components to produce a high voltage.

It is another object of the invention to provide an electrical converter that produces a high output voltage, while applying only a portion of that output voltage across its switching transistor.

It is another object of the invention to provide an electrical converter that produces a high voltage at high efficiency.

It is another object of the invention to provide an electrical converter that produces a high voltage while dissipating relatively little power.

It is another object of the invention to provide a step up electrical converter that steps up the voltage in multiple stages using a single switch and a single control.

It is another object of the invention to provide a step up electrical converter including a mechanism to control the rate of voltage change across the switch.

DETAILED DESCRIPTION

Figure 2:
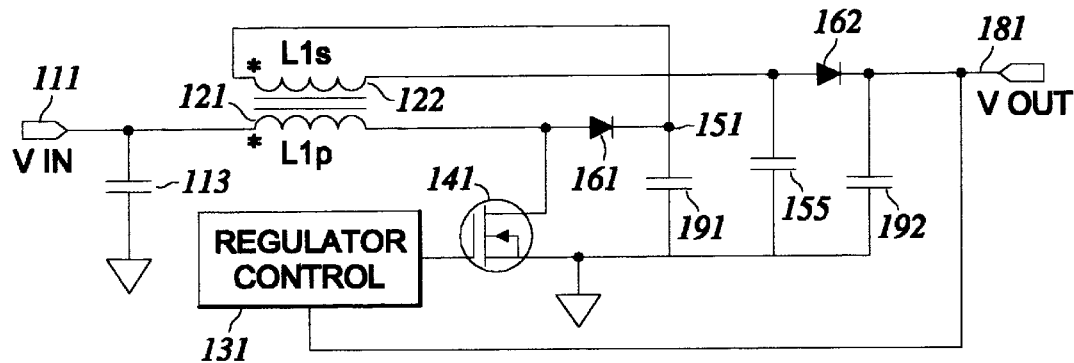
FIG. 2 is a schematic diagram of one embodiment of the reboost converter of the invention.

One embodiment of a "reboost converter" constructed in accordance with the invention is shown schematically in FIG. 2. The reboost converter includes a primary input terminal 111 for receiving a primary input voltage $V_{in}$. The reboost converter produces a final output voltage $V_{out}$ at a final output terminal. The final output voltage $V_{out}$ is higher than the primary input voltage $V_{in}$.

The reboost converter shown in FIG. 2 includes a boost converter subsystem. The boost converter subsystem includes a subsystem input terminal connected to the primary input terminal for receiving the input voltage $V_{in}$. The boost converter subsystem produces at an intermediate or subsystem output terminal 151 an intermediate voltage. The intermediate voltage is higher than the primary input voltage $V_{in}$, but less than the final output voltage $V_{out}$. The remainder of the voltage step up is provided by one or more secondary stages, each of which includes a secondary winding 122 on the inductor.

The boost converter subsystem comprises a first winding 121 of an inductor having its input side connected to the primary and subsystem input terminal 111. The first winding has inductance L1p. A switch, such as a FET 141, is connected between the output side of the inductor winding 121 and a second terminal, which is typically connected to ground. In the illustrated embodiment, the switch is a FET with its drain connected to the output side of the inductor, and its source connected to ground. A first rectifying diode 161 is connected between the output side of the inductor and the boost subsystem output terminal 151. Finally, a first filter capacitor 191 connects the boost subsystem output terminal to the second terminal (ground) to aid in maintaining a constant intermediate voltage at the boost system output terminal.

In accordance with the invention, a second stage provides voltage step up from the intermediate voltage produced by the boost converter subsystem to a voltage higher than the intermediate voltage. The second stage may be considered to have a second stage input terminal coincident with the output terminal 151 of the boost converter subsystem. The second stage includes a second stage output terminal. In the illustrated embodiment of FIG. 2, the second stage output terminal is the system output terminal 181, and the output of the second stage is the final converter output voltage $V_{out}$.

The second stage includes a second winding 122 applied to the inductor. The "input" side of the second winding 122 is connected to the intermediate or boost subsystem output terminal 151. The second winding 122 is connected in phase with the first winding 121 such that the "input" side of the second winding is connected to the DC output voltage from the boost converter subsystem.

A second rectifying diode 162 is connected to the "output" side of the second winding 122. The anode of the second diode is connected to the second winding. The cathode of the second rectifier diode is connected to the output terminal of the second stage.

A "snubber" capacitor 155 is connected between the "output" side of the second winding 122 and ground. As will be described below, the snubbing action of the snubber capacitor controls the rate at which the voltage at the drain of the switch 141 slews.

A second filter capacitor 192 is connected between the second stage output terminal and ground. The second filter capacitor 192 helps to keep the system output voltage constant.

The first and second windings 121, 122 are connected in a series aiding fashion, so that the final output voltage $V_{out}$ is the composite of the voltages produced on the two windings and the input voltage.

When the switch 141 is on, current flows through the first winding 121 of the inductor, and a magnetic field builds up in the inductor core. The polarities of both the first and second windings are such that the two rectifier diodes 161, 162 are reverse biased. While the FET switch 141 is conducting, the voltage across the snubber capacitor 155 is equal to one half the output voltage $V_{out}$ minus the primary input voltage $V_{in}$, assuming that the primary and secondary windings have the same number of turns. In the exemplary embodiment, the primary input voltage $V_{in}$ is +28 VDC, and the system output voltage $V_{out}$ at the system output terminal is +270 VDC. The voltage across the snubber capacitor 155 is $(270-28)/2=121$ volts.

When the FET 141 is turned off, so that the switch is open or nonconductive, the current flowing through the first winding 121 of the inductor rapidly reverses direction. The collapse of the magnetic field in the inductor core will drive the anodes of the rectifier diodes 161, 162 positive. The regulator control 131 adjusts the duty cycle for the FET gate drive as required so that the voltage at the system output terminal remains a constant 270 VDC.

The regulator control 131 includes a precision resistive divider with a ratio of 54:1 in this illustrative embodiment, which reduces the output voltage to a 5.0 volt sample. This sample is compared against a precision 5.0 volt reference. The resultant error voltage, when compared against a sawtooth waveform, produces a pulse width modulated signal. The output voltage is equal to the input voltage divided by the quantity of one minus the duty cycle $[V_0=V_1/(1-D)]$. The regulator control 131 will alter the duty cycle, as required, to maintain a constant output voltage. This process is well understood by those skilled in the art.

If the number of turns in each winding 121, 122 on the inductor of the converter system are the same, the voltage difference between the system output voltage $V_{out}$ and the primary input voltage $V_{in}$ is evenly divided between the windings. In the illustrated embodiment having two windings, half the voltage difference appears across the first winding 121, and half the voltage difference appears across the second winding 122. In the illustrated embodiment having a primary input voltage $V_{in}$ of +28 VDC and a system output voltage $V_{out}$ of +270 VDC, the voltage difference is 242 volts. One half of that voltage difference is across each winding. In this embodiment, 121 volts appears across each winding.

When the switch 141 is opened, the drain of the FET switch rises to the primary input voltage plus one half the difference between the system output voltage and the primary input voltage, which is $((V_{out}-V_{in})/2)+V_{in}$. Using the values for $V_{out}$ and $V_{in}$ above, the drain of the FET rises to $((270-28)/2)+28=149$ volts. Thus, the "input" end of the secondary winding of the inductor is "anchored" at 149 VDC, the system output voltage will be that voltage plus the voltage across the second winding. Thus, the system output voltage will be $149+121=270$ VDC.

The slew rate of the FET drain will be limited by the snubbing action of the snubber capacitor 155. The voltage across the snubber capacitor is driven from 121 volts to 270 volts while the drain of the FET is rising from 0 volts to 149 volts. At the time at which the FET is turned off, a typical current peak is 15 amp. The current through the first winding 121 of the inductor divides between the parasitic capacitance in the FET (Coss) and the capacitance of the snubber capacitor. The parasitic capacitance Coss of the FET 141 may be, for example, 1090 pF. The capacitance of the snubber capacitor 155 may be 1000 pF. The current will divide accordingly, and the transition time will be approximately 20 nanoseconds (nS).

Figure 1:
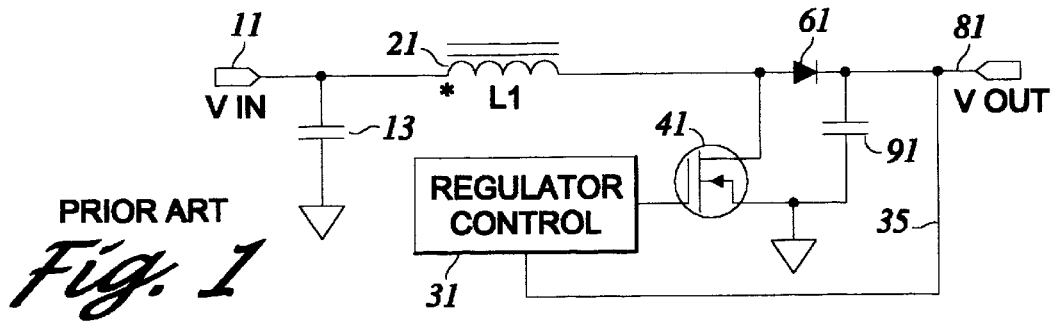
FIG. 1 is a schematic diagram of a boost converter of a known type.

The maximum voltage that is applied across the switch 141 is one half the voltage across the switch 41 of the boost converter shown in FIG. 1. Therefore, a 200 volt rated part f or the FET 141 of the converter shown in FIG. 2 would be sufficient. The entire converter is controlled by only one regulator control 131.

As noted above, the FET used as the switch in the boost converter of FIG. 1 should be rated to at least 400 volts for a boost converter that generates 270 VDC. A typical FET of such a rating has a die size of approximately 0.27 in by 0.416 in, and, when on, has a forward resistance between the source and drain of 0.16 ohms ($R_{DS(ON)}$). In contrast, a FET with equal die size and rated to withstand 200 volts across the source and drain has a resistance of approximately 0.045 ohms. For a power converter with a primary input voltage of +28 VDC that generates a final output voltage of +270 volts, running at 125 watts of output power, the power dissipation in the switching FET caused by the "on" resistance will be the $I^2R$ product. If the RMS current into the switch is 7.3 amps (typical for such a converter), the FET forward conduction losses will be 8.6 watts with a 400 volt switch. However, with a 200 volt switch, the forward conduction losses are only 2.4 watts.

A well designed converter operating in the above power range may be expected to have total losses, excluding the FET forward conduction losses, of approximately 6.5 watts. Since the FET forward conduction losses are the largest single contributor to total system losses, reducing the FET forward conduction losses significantly reduces total system losses.

In a boost converter such as shown in FIG. 1 incorporating a FET rated at 400 volts, the total losses will be 8.6+6.5=15.1 watts. If the converter is operating at an output power of 125 watts, then the overall efficiency is 89.2%. Using the converter of the invention with a switch rated at 200 volts, the total losses will be 2.4+6.5=9.9 watts. Thus, for a converter operating at an output power of 125 watts, the overall efficiency is 92.7%. Total losses are decreased by 34%. This improvement is further enhanced when the power converter is operating at a low line input condition when the RMS current increases and conduction losses rise by the square of that increase.

In some applications a higher output voltage VOUt is required. The ratio of the number of turns in the first and second windings 121, 122 of the inductor may be adjusted so that the second winding 122 (second stage of the converter system) produces more voltage while continuing to limit the voltage across the switch 141.

Figure 3:
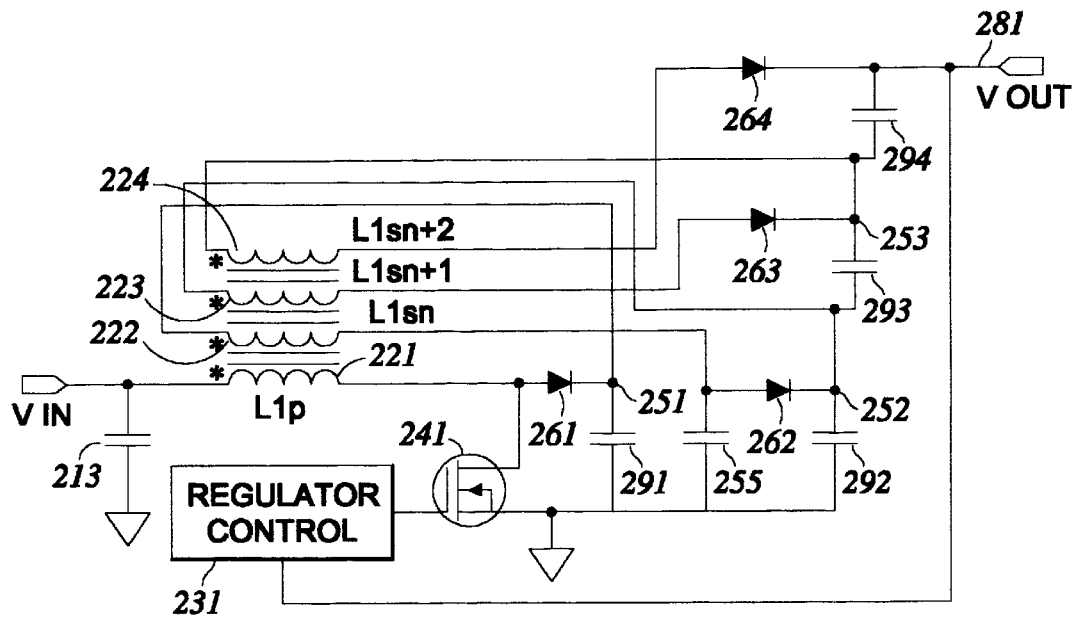
FIG. 3 is a schematic diagram of another embodiment of the reboost converter of the invention.

Another embodiment of the reboost converter for developing higher system output voltages is shown in FIG. 3. In this embodiment, additional secondary windings are added to the inductor. A recitifying diode and a filter capacitor are added with each additional secondary winding.

This embodiment includes a first stage boost converter having an input capacitor 213 and a first winding 221 on an inductor. A FET switch 241 is connected to the output side of the first winding 221. A regulator control 231 is connected to the gate of the FET 241 to control the FET. A first rectifier 261 connects the first winding of the inductor to a first stage output point 251. A first stage output capacitor 291 connects the first stage output point to ground. The first stage boost converter produces a first intermediate voltage at the first stage output point 251.

The second stage includes a second winding 222, a second rectifier 262, and a second filter capacitor 292. The input side of the second winding 222 is connected to the output point 251 of the first stage. The second rectifier 262 connects the output side of the second winding 222 with a second stage output point 252. A snubber capacitor 255 connects the output side of the second winding 222 and ground. A second intermediate voltage is produced at the second stage output point 252. The second intermediate voltage is higher than the first intermediate voltage.

The third stage includes a third winding 223 on the same inductor core, a third rectifier 263, and a third filter capacitor 293. The input side of the third winding 223 is connected to the output point 252 of the second stage. A third intermediate voltage, higher than the second intermediate voltage, is produced at the third stage output point 253.

The fourth stage includes a fourth winding 224 on the same inductor core, a fourth rectifier 264, and a fourth output filter capacitor 294. The input side of the fourth winding 224 is connected to the output point 253 of the third stage. The final converter output voltage $V_{out}$ is produced on the converter output terminal 281.

The embodiment shown in FIG. 3 will operate as the embodiment shown in FIG. 2, except that the formulas are changed to reflect the additional windings on the inductor. In addition, ratios are changed if the number of turns on the windings differ. The inductor should be designed to minimize inter-layer parasitic capacitances. Single layer solenoid construction is recommended, with all secondary windings having the same number of turns.

As can be seen, the windings are connected in a series aiding arrangement. The voltage output at each stage becomes the input voltage for the next stage, and the final output voltage $V_{out}$ is the composite of the voltages of all the windings. Only one regulator control and one switch are used.

Referring to the example shown in FIG. 3, a primary winding is part of a boost converter. Three secondary windings are shown. If the first winding and all the secondary windings have the same number of turns, one quarter the difference between the system output voltage $V_{out}$ and the primary input voltage $V_{in}$ will be produced in each winding. While the FET is conducting, all four of the rectifiers are reverse biased. Thus, while the FET is conducting, the voltage across the snubber capacitor is equal to one quarter the difference between the final output voltage and the primary input voltage.

When the FET is turned off, the voltage applied to the anodes of all four rectifiers will become positive. Again assuming the number of turns on each of the four windings is the same, the voltage across each winding will be the same. Each winding has a voltage of $(V_{out}-V_{in})/4$. The drain of the FET will rise to $(V_{out}-V_{in})/4+V_{in}$.

Those skilled in the art will recognize that other modifications can be made to the power converter embodiments described above without departing from the spirit of the invention. Therefore, the above embodiments are to be considered exemplary, and not limiting.

What is claimed is:

1. A step-up DC switching voltage converter to produce an output voltage that is higher than an input voltage, the converter comprising:

a) an input terminal for receiving an input voltage;
   b) an output terminal;
   c) a magnetically coupled inductor having;
      i) a first stage winding connected to the input terminal; and
      ii) a second stage winding magnetically coupled to the first stage winding;
   d) a diode connected in series between the first and second stage windings, the diode connecting the first and second stage windings in a voltage adding fashion;

e) a field regulating switch connected between the first and second stage windings and ground to regulate a magnetic field between the coupled first and second stage windings such that the voltage across the field regulating switch when the switch is in an open position is the sum of the input voltage and the voltage across the first stage winding;

f) a regulator control circuit to trigger the operation of the field regulating switch when the voltage at the output terminal falls below a preset level; and g) the voltage at the output terminal being the sum of the first stage winding voltage, the second stage winding voltage and the input voltage.

2. The step-up converter of claim 1 further comprising a first filter capacitor connected between the second stage winding and ground, a second filter capacitor connected between the second stage winding and the output terminal, and second diode connected between the second stage winding and the output terminal to further filter the output voltage.

3. A step-up voltage converter of claim 2 wherein the regulator control circuit compares the output voltage to a reference voltage to thereby maintain the output voltage at a preset level by triggering the field regulating switch.

4. A step-up voltage converter of claim 3 wherein the field regulating switch comprises a switching transistor.

5. A step-up voltage converter of claim 4 wherein the switching transistor is a Field Effect Transistor.

6. A step-up voltage converter of claim 2 wherein the first stage winding comprises a number of turns and the second stage winding comprises a number of turns and the number of turns on the first stage winding is equal to the number of turns on the second stage winding such that the first voltage is about equal to the second voltage.

7. A method of increasing a voltage with a step-up DC switching voltage converter comprising the steps of:

a) generating an input voltage at an input terminal;

b) generating a first voltage on a first stage winding of a coupled inductor from the input voltage;

c) generating a second voltage on a second stage winding of the coupled inductor from the first stage winding magnetically coupled thereto;

d) operating a field regulating switch in electrical communication with the inductor to control a first magnetic field of the first stage winding and a second magnetic field coupled to the first magnetic field in response to a preselected output voltage;

e) combining the input voltage, the first voltage and the second voltage through a diode connected in series between the first and second stage windings to produce an output voltage that is the sum of the input voltage, the first stage winding voltage and the second stage winding voltage.

8. The method of claim 7 wherein a regulator control circuit is in communication with the switch and the output terminal to trigger the field regulating switch.

9. The method of claim 8 wherein the field regulating switch is a Field Effect Transistor.

10. The method of claim 9 wherein the first stage winding comprises a number of turns and the second stage winding comprises a number of turns and the number of turns on the first stage winding is equal to the number of turns on the second stage winding such that the first voltage is about equal to the second voltage.

* * * * *